Figure 1:
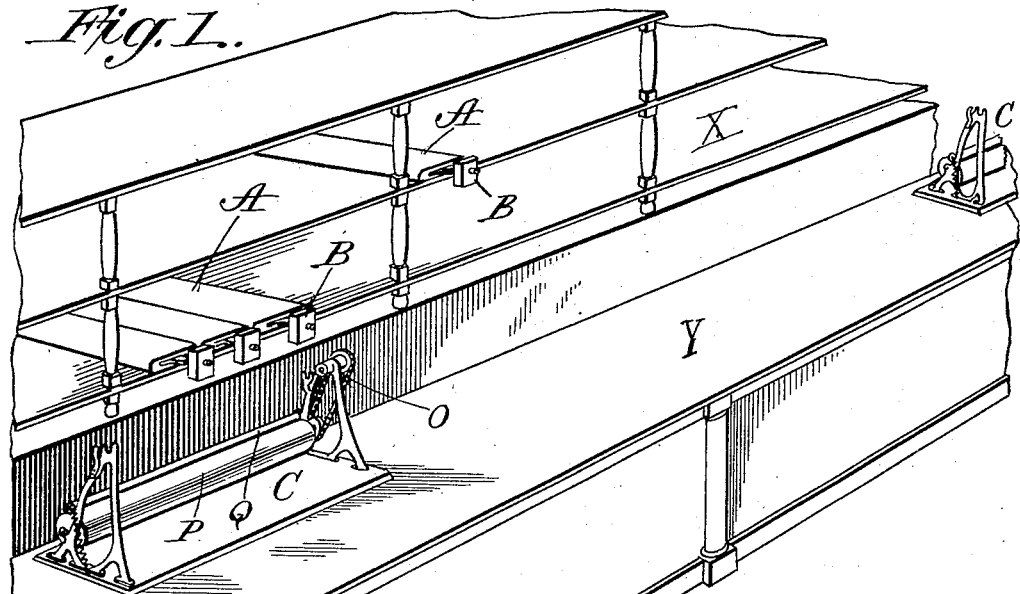

W. D. SIMPSON & H. N. EDMUNDS.
STOCK REGISTERING AND MEASURING MACHINE FOR CLOTH.
APPLICATION FILED OCT. 12, 1915.

1,177,825.

Patented Apr. 4, 1916.

2 SHEETS—SHEET 1.

Witnesses
P. J. Gathmann
M. E. Burrell

Inventors
William D. Simpson,
Harry N. Edmunds.

By their Attorneys:
Baldwin Wright

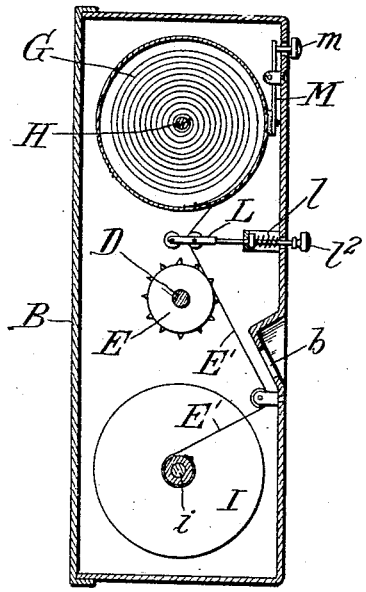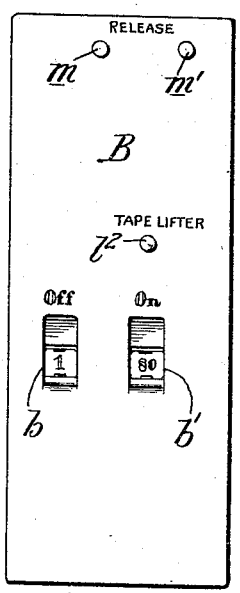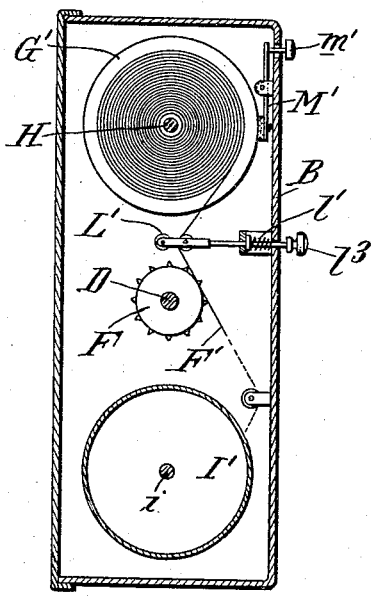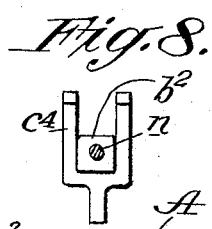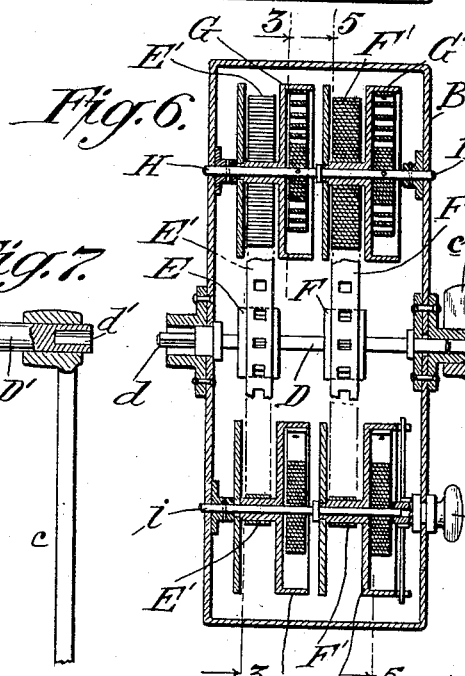

UNITED STATES PATENT OFFICE.

WILLIAM D. SIMPSON AND HARRY N. EDMUNDS, OF COLUMBIA, SOUTH CAROLINA.

STOCK REGISTERING AND MEASURING MACHINE FOR CLOTH.

1,177,825.  Specification of Letters Patent.  Patented Apr. 4, 1916.

Application filed October 12, 1915. Serial No. 55,435.

*To all whom it may concern:*

Be it known that we, WILLIAM D. SIMPSON and HARRY N. EDMUNDS, both citizens of the United States, and both residing in Columbia, in the county of Richland and State of South Carolina, have invented certain new and useful Improvements in Stock Registering and Measuring Machines for Cloth, of which the following is a specification.

The object of this invention is to provide simple and efficient means for measuring cloth as it is sold, and at the same time making a record of the amount sold and the amount remaining on the bolt from which the cloth is taken.

A further object of the invention is to provide mechanism of the kind above referred to which may be so connected with the bolt of cloth that it may display the record when the bolt is on the shelf.

According to this invention each bolt of cloth is provided with a measuring and registering device, and this is attached to the outer end of the bolt while on the shelf so that by merely glancing at the records of the several bolts the amount of cloth unwound from the bolts and the amount remaining thereon can be readily seen. In this way, not only can the salesman readily tell how much has been sold from each bolt and how much remains thereon, but an inventory of the stock can be readily obtained without unwinding the cloth from the several bolts and taking measurements as is commonly done.

In carrying out our invention, we attach to each bolt of cloth mechanism which records the amount of cloth unwound from the bolt and the amount remaining thereon, such record being indicated through the casing of the mechanism, and we also provide a holder for the bolts which is adapted to support a bolt while cloth is being unwound therefrom, and this holder is provided with means for connecting it to the recording mechanism, the construction and arrangement being such that when a bolt is placed in a bolt-holder and operatively connected with suitable parts thereof the cloth may be drawn from the bolt without manual measurement, the measurements being indicated by the recorder through suitable openings therein. We provide a single holder adapted to receive any one of a group of bolts, and preferably where the shelves are extensive we provide holders at suitable distances apart for convenience in the handling of the bolts.

Our improvements are illustrated in the accompanying drawings, in which—

Figure 2:
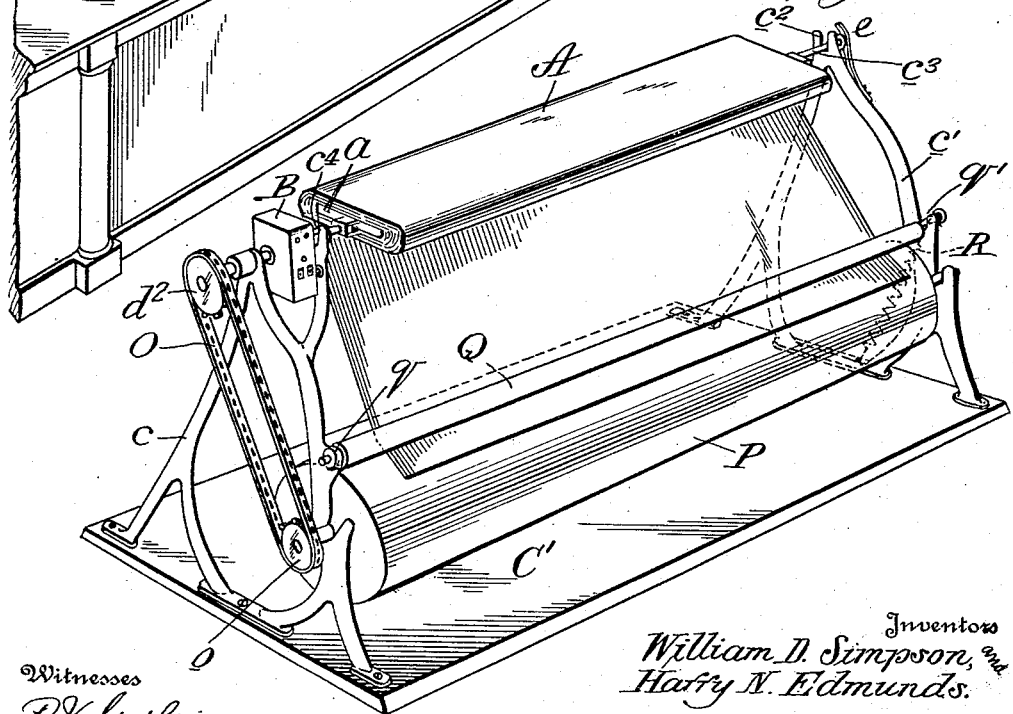

Figure 1 is a perspective view of a portion of store shelves showing bolts of cloth thereon equipped with our improved recording and indicating mechanism. Fig. 2 is a perspective view of one of the bolt-holders with a bolt support thereon and operatively connected with the measuring mechanism thereof. Fig. 3 shows a vertical section through the recording and indicating mechanism on the line 3—3 of Fig. 6. Fig. 4 is a front view of the recording and indicating mechanism. Fig. 5 shows a vertical section on the line 5—5 of Fig. 6. Fig. 6 shows a vertical section taken at right angles to the section indicated in Figs. 3 and 5, and this figure also shows how the recording and indicating mechanism is connected with a bolt of cloth. Fig. 7 is a detail view, showing how the recording and indicating mechanism is operatively connected with the measuring mechanism of the bolt-holder. Fig. 8 is a detail view in section on the line 8—8 of Fig. 6.

According to our invention each bolt of cloth A is provided with a recording and indicating device B, as shown in Fig. 1. As the bolts lie on the shelves X the recording and indicating devices are held to the front so that they may be clearly seen. The holder C which supports the bolts while the cloth is being measured and sold is placed on the counter Y in convenient proximity to a batch or group of bolts, and several such holders may be used, placed at convenient intervals, as indicated in Fig. 1.

Each recording and indicating device comprises a suitable case provided at the front with openings $b$, $b'$ to display the tapes within bearing numbers, indicating the amount of cloth removed from the bolt and the amount of cloth left thereon. A shaft D extends transversely across the case and is mounted in suitable bearings so as to turn therein. It carries two sprocket wheels E and F, which engage perforations in the tapes E' and F' respectively. The tape E' is wound on a spring drum G and the tape F' is wound on a spring drum G'. These drums are mounted to rotate on a stationary shaft H, secured to the casing in the manner indicated in Fig. 6. The arrangement is such that the drums tend to wind up the tapes or hold them wound, but the tapes are adapted to unwind from the drums when drawn therefrom by the sprocket wheels. The tape E′ is marked with a series of numbers to indicate, for instance, the number of yards of cloth removed from the bolt, and the tape F′ is similarly marked to indicate the number of yards remaining on the bolt. To take up the slack of the tapes withdrawn from the drums G, G′ we provide spring drums I, I′ which are mounted to turn on a stationary shaft $i$ secured to the casing. The drum I′ is provided with a handle K by means of which it may be adjusted. The drums I, I′ exert a constant tension on the tapes and receive the tapes as fast as they pass the sprocket wheels. The tapes are held in engagement with the sprocket wheels by guides L, L′ which are pressed inward by springs $l$, $l'$, but may be drawn outward by knobs or handles $l^2$, $l^3$. Each drum G, G′ is provided with a brake M, M′, operated by a button $m$ or $m'$, as indicated in Figs. 3 and 5.

The recording and indicating device is attached to the bolt in such manner as to be permanently connected therewith. This may be done in various ways. As shown, the boss $b^2$ surrounding the shaft D receives the stem $n$ of a bifurcated arm N which engages the board or plank $a$ of the bolt. The shaft D has a squared end $d$ adapted to engage a corresponding socket $d'$ in a short shaft D′, carrying a sprocket wheel $d^2$, with which engages a sprocket chain or belt O, in turn engaging a sprocket wheel $o$ on the shaft of a drum P mounted in the holder C. When the bolt of cloth is on the shelf the shaft D has no connection with the shaft D′, but when cloth is being measured the bolt is taken from the shelf and placed in the holder C. This as shown comprises a base plate C′ and side frames $c$, $c'$. The frame $c'$ has an open bearing $c^2$ adapted to receive a short shaft $c^3$ attached to the bolt A, and it will be understood that this shaft is always attached to the bolt while any cloth remains thereon. The side frame $c$ is in like manner provided with an open bearing $c^4$ adapted to receive the boss $b^2$ attached to the frame of the recording and indicating device. This open bearing $c^4$ is indicated in both Figs. 2 and 6, and it will be seen that the boss is squared so that the recording and indicating devices will be held against rotation but the bolt is free to rotate while the cloth is being drawn from it. It will be understood that a bolt of cloth may be taken from a shelf and quickly set in position on the holder and the short shaft D′ may be made to engage the shaft D so that when the sprocket belt O is turned the recording and indicating mechanism will be operated. The drum P is mounted in suitable bearings in the frame of the holder and the cloth is drawn from the bolt over the drum in the manner indicated in Fig. 2.

The cloth is held firmly against the drum by means of a roller Q mounted in suitable bearings at one end $q$ and mounted in open bearings at its opposite end $q'$. At this end of the roller is attached a spring R which draws the roller firmly against the cloth and presses it against the drum. The cloth is withdrawn from the bolt and passed under the roller Q and over the drum P, as indicated in Fig. 2. It is obvious that by suitably adjusting the diameter of the drum, its distance from the bolt, and the mechanism of the recording and indicating device the amount of cloth unwound from the bolt may be suitably recorded and indicated.

We have not indicated in the drawings any housing or casing for the sprocket belt O, but it is obvious that a suitable casing may be provided. A spring $e$ so presses on the shaft $c^2$ as to hold the stem $n$ in the boss $b^2$.

In operation the measuring of the cloth should begin from its front edge as it commences to emerge from between the drum P and the roller Q, but it is obvious that other arrangements can be provided for determining the proper relation between the drum and the recording mechanism when marking and numbering the tapes.

The tapes E′ and F′ may be marked to indicate any desired number of yards, such as 80 yards, but when it is desired to indicate a smaller number of yards, 60, for instance, the tape F′ may be properly adjusted by means of the knob or handle K and the guide L′; that is to say, by pulling out the knob $l^3$ the tape F′ may be disengaged from the sprocket wheel F and by then turning the knob K the spring drum I′ may be turned until the proper number, say 60, appears at the opening $b'$, after which the mechanism may be operated as before. In this way, our apparatus may be applied to bolts containing any number of yards of cloth.

As before stated each drum G, G′ is provided with a brake which exerts pressure thereon. When it is desired to rewind the tapes on the drums the guides L, L′ may be operated to release the tapes from the sprocket wheels E and F and the brakes M, M′ may be released from the drums so that the tapes will be quickly wound thereon. The speed of rotation of the drums may be controlled by the brakes.

The operation of the several parts of the mechanism has heretofore been described and it will be observed that the mechanism is quite simple, inexpensive and requires but little attention from the salesman. While the bolts of cloth are not in use they are placed on a shelf, in the manner indicated in Fig. 1, where they are in plain sight for the information of the salesman, or when stock is being taken. When goods is wanted from one of the bolts the latter is lifted from the shelf and placed on the holder C, the laterally projecting arms of the bolt being easily received in the open bearings of the holder. The shaft D of the mechanism is then made to engage the short shaft D' and when this is done the mechanism is ready for use. The cloth is drawn from the bolt A over a measuring drum P and this latter is geared to the registering and indicating mechanism and operates it in the manner before described. After the desired amount of cloth is unwound from the bolt it may be cut off, then the shaft D' may be separated from the shaft D and the bolt may be replaced on the shelf.

We claim as our invention:—

1. A register for cloth measuring machines combined with means for attaching it to a bolt of cloth whereby it may be moved from place to place bodily therewith, a holder for the bolt, a measuring drum thereon, gearing interposed between the drum and the registering mechanism, and devices for detachably connecting said gearing with the registering mechanism.

2. Registering and indicating means for cloth measuring machines combined with means for attaching it to a bolt of cloth whereby it may be moved from place to place bodily therewith, a holder for the bolt in which it is mounted to turn, a measuring drum supported in said holder, gearing interposed between the drum and the registering mechanism, and devices for detachably connecting said gearing with said registering mechanism.

3. The combination with a bolt of cloth, of supporting arms projecting from opposite ends thereof, a holder for the bolt having open bearings for the arms whereby the bolt may be placed on and removed from the holder, registering mechanism carried by the bolt, a measuring drum on the holder, a shaft supported in the holder and detachably connected with the registering mechanism, and gearing connecting said shaft with the measuring drum.

4. A register for cloth-measuring machines, comprising a casing, means for attaching said casing to a bolt of cloth, numbered tapes within said casing, spring drums on which they are wound, spring drums which receive the tapes unwound from the first-mentioned drums, sprocket wheels on said shaft for moving the tapes, a holder for the bolt of cloth, a measuring device thereon, and gearing connecting said measuring device with the shaft of the register and which is detachably connected with said shaft.

In testimony whereof, we have hereunto subscribed our names.

WILLIAM D. SIMPSON.
HARRY N. EDMUNDS.

Witnesses as to Wm. D. Simpson:
  W. F. BLACKBURN,
  A. R. DE PASS.
Witnesses as to H. N. Edmunds:
  ELMA MARKS,
  MARION REYNOLDS.

Copies of this patent may be obtained for five cents each, by addressing the "Commissioner of Patents, Washington, D. C."